3,814,612
GLASS USEFUL FOR FORMING A REED SWITCH SEALING TUBE

Kozo Inoue, Kobe, Toshito Hara, Kawasaki, Takeo Kitazawa, Sagamihara, Kazuyoshi Yamamoto, Hyogo-ken, and Toshiro Oguma, Susaka, Japan, assignors to Fujitsu Limited, Kawasaki-shi, Kanagawa-ken, Japan
Filed June 6, 1972, Ser. No. 260,183
Claims priority, application Japan, June 11, 1971, 46/41,561
Int. Cl. C03c 3/103; H01j 17/18
U.S. Cl. 106—52
4 Claims

ABSTRACT OF THE DISCLOSURE

A reed switch sealing glass tube having a thermal expansion coefficient similar to that of the reed strips, substantially no devitrification tendency and an excellent infrared ray absorption is provided by a glass consisting essentially of 58 to 64% of $SiO_2$, 3 to 5% of $Al_2O_3$, 11 to 15% of BaO, 18 to 23% of the sum of $K_2O$ and $Na_2O$ and 2 to 8% of FeO by weight.

---

Figure 1:
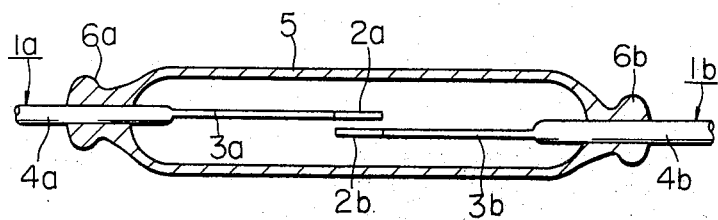

The present invention relates to glass useful for providing a seal tube for a remanent reed switch; more particularly, it relates to a glass having excellent infrared ray absorption, substantially no devitrification and having a proper thermal expansion coefficient.

The reed switch is provided with a pair of reed strips the ends of which face each other so as to form a contact. The contact portions of the reed strips are usually sealed hermetically in a glass tube. The sealing is effected by inserting the contact portions of the reed strips into the glass tube, fusing the ends of the glass tube at a temperature higher than the melting point of the glass, closing hermetically the fused ends of the glass tube while removing air from the tube or substituting air in the tube by an inert gas such as nitrogen, argon and helium, and then cooling the sealed switch device to room temperature. In this cooling step if the glass tube has a thermal expansion coefficient substantially lower or higher than that of the reed strips, the glass is stressed internally and sometimes broken due to the difference between the shrinkages of the glass tube and the reed strips.

The remanent reed switch has a self-holding property so that even after the exciting current for closing the switch is cut off, the switch remains in the closed condition under which the reed strips make contact with each other. Particularly, in the case where the reed strip has the self-holding property, the reed strip is made of a special material having a limited composition, for example, an alloy consisting of 73 to 93% by weight of cobalt, 1 to 5% by weight of nickel and the balance of iron. Such special material for the self-holding reed strips results in a narrow range of thermal expansion coefficient of about $$110 \times 10^{-7}/°\text{C.}$$

to $130 \times 10^{-7}/°$ C.

Therefore, it is desirable that the glass tube for sealing the reed strips have a thermal expansion coefficient similar to that of the reed strips. However, commercial glass for a sealing glass tube has a thermal expansion coefficient of about $100 \times 10^{-7}/°$ C. much lower than that of the reed strips. Accordingly, it is obvious that commercial glass is unsatisfactory for sealing the reed strips of the remanent reed switch device.

It is known that although a glass containing an alkaline component in an amount larger than that contained in commercial glass for a sealing tube has a relatively large thermal expansion coefficient, such large amount of the alkaline component results in increase of the devitrification property and lowering of the insulation resistance of the glass.

Also, it is known that the addition of FeO to glass is effective to enhance infra-red ray absorption of the glass. The inventor has discovered that the addition of FeO is also effective to prevent the devitrification of the alkali glass containing a large amount of the alkali component, and, therefore, having a high thermal expansion coefficient.

An object of the present invention is to provide a glass useful for the sealing glass tube of a remanent reed switch device having a corresponding thermal expansion coefficient, a low devitrification tendency and a high workability.

The above-stated objects of the present invention are accomplished by a glass consisting essentially of 58 to 64% by weight of $SiO_2$, 3 to 5% by weight of $Al_2O_3$, 11 to 15% by weight of BaO, 18 to 23% by weight of the sum of $K_2O$ and $Na_2O$ and 2 to 8% by weight of FeO.

Figure 2:
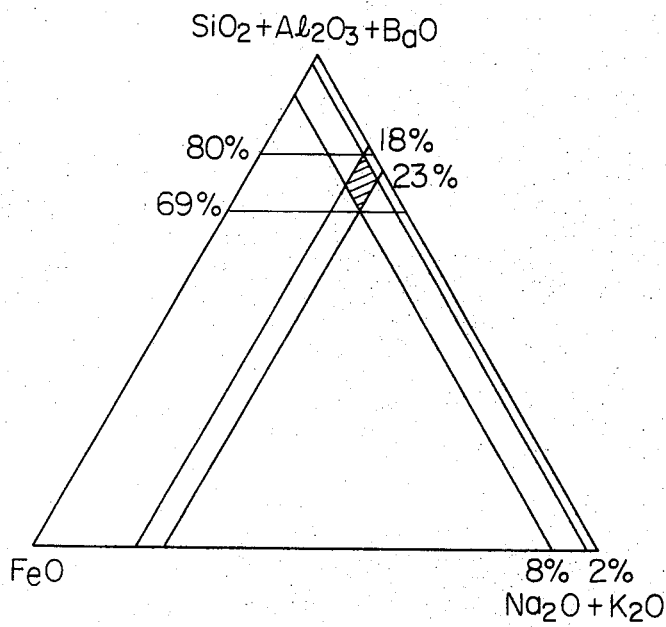
Figure 3:
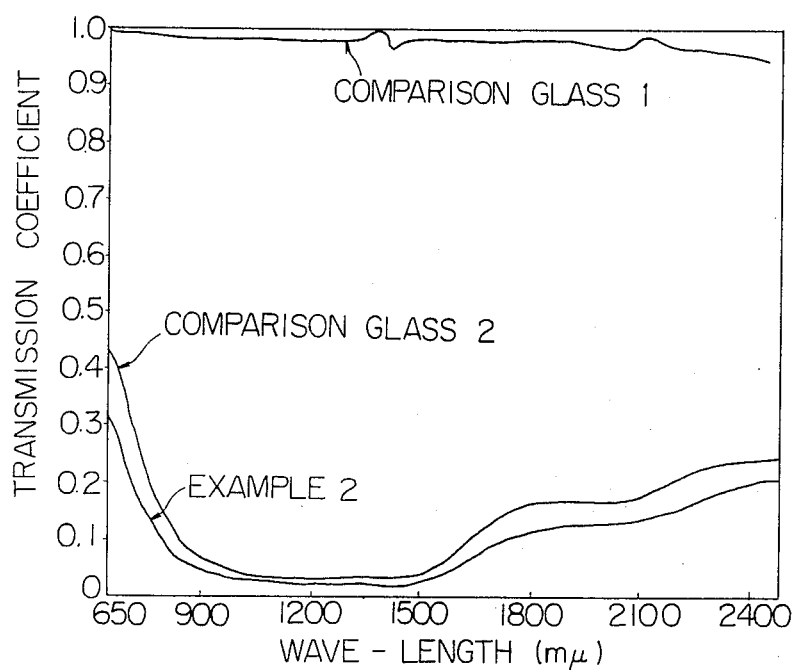

The features and advantages of the glass of the present invention will be apparent from the following description and the accompanying drawings, in which FIG. 1 shows a schematic cross-sectional view of a remanent reed switch, FIG. 2 shows the range of the amounts of components suitable for forming the glass of the present invention, FIG. 3 shows the relationship between the wavelength of infrared rays and transmission coefficient of an embodiment of the glass of the present invention in comparison with other glasses.

Referring to FIG. 1, a pair of reed strips 1a and 1b are made of a semi-hard magnetic material and have contact portions 2a and 2b, flat portions 3a and 3b and rod portions 4a and 4b, respectively. The contact portions 2a and 2b are plated with a noble metal such as rhodium, palladium, gold or platinum and make contact with each under electrical current excitation. The flat portions 3a and 3b have a high stiffness so as to resist bending. The rod portions 4a and 4b are connected to the desired circuit.

In FIG. 1, the contact portions 2a and 2b, the flat portions of 3a and 3b and ports of the rod portions 4a and 4b of the reed strips 1a and 1b are contained in a glass tube 5, and both the ends 6a and 6b of the glass tube 5 are hermetically closed around the rod portions 4a and 4b so as to seal the reed strip 1a and 1b.

The periphery of the simple reed switch device is surrounded by a coil (not shown in the drawing).

When the reed strips 1a and 1b are excited by flowing electric current through the coil in the predetermined direction, the contact portions 2a and 2b are brought into contact with each other so as to switch on, and when the reed strips 1a and 1b are excited in the opposite direction, the contact portions 2a and 2b are separated from each other so as to switch off.

In the sealing operation of the reed strips 1a and 1b in the glass tube 5, the reed strips 1a and 1b are inserted into the glass tube 5 through the ends 6a and 6b thereof into the position where the contact portions 2a and 2b overlap each other for a predetermined length, and then the glass tube ends 6a and 6b are fused at a temperature higher than the melting point of the glass by infrared radiation and closed hermetically around the rod portions 4a and 4b. In such sealing, the glass tube 5 is thermally expanded and the lead strips are also expanded to such an extent that the overlapped length of the contact portions 2a and 2b is not substantially altered.

After the sealing is completed, the finished switch device is cooled to a room temperature.

As stated above, in the conventional remanent reed switch device, the lead strips have a thermal expansion coefficient of $110 \times 10^{-7}$ to $130 \times 10^{-7}/°$ C. and the conventional glass tube has a thermal expansion coefficient of about $100 \times 10^{-7}/°$ C., which is much smaller than that of the reed strip. Accordingly, during the cooling of the sealed switch device, the glass tube is internally stressed due to the difference between the shrinkages of the glass tube and the reed strips and sometimes broken due to this internal stress.

Needless to say, if the glass tube is broken, the reed switch device is not operative. Particularly, the glass tube thus stressed internally tends to break under small pressure applied to the reed strips.

Accordingly, a glass tube made from conventional sealing glass, for example, consisting of 2.96% of $Al_2O_3$, 6.39% of $B_2O_3$, 3.73% of FeO, 14.51% of $K_2O$, 67.82% of $SiO_2$ and 3.83% of $Na_2O$ by weight, is unsuitable for producing a remanent switch device having a high durability.

Generally, it is known that in order to enhance the thermal expansion coefficient of glass, it is effective to increase the content of the alkali component in the glass. However, increasing the content of the alkali component results in high devitrification tendency of the glass at high temperature and humidity.

Further, when an electromotive force is impressed between the terminals of the reed switch, devitrification of the glass tube is promoted. Such devitrification of the glass tube causes decrease in insulation resistance of the glass. Moreover, in the case of the remanent reed switch, devitrification of the glass causes decrease of hermeticity of the sealing glass tube and results in gas leakage from or into the glass tube therethrough. This gas leak results in deterioration of the operation of the lead switch.

In order to dissolve the above-stated disadvantages of the conventional sealing glass tube, a modified glass containing $SiO_2$, $Na_2O$, $K_2O$, BaO and $Al_2O_3$, for example, in the following proportions is available.

| Component: | Weight percent |
|---|---|
| $SiO_2$ | 62.2 |
| $Al_2O_3$ | 3.0 |
| $K_2O$ | 7.5 |
| $Na_2O$ | 13.0 |
| BaO | 13.3 |

This modified glass has a suitable thermal expansion coefficient and a slightly lowered devitrification tendency. However, it seems that the modified glass is still not low enough in devitrification tendency and also has a poor infrared ray absorption property. Such poor absorption of infrared rays by the result in modified glass poor workability due to difficulty in thermal fusion of the glass.

The glass of the present invention is capable of eliminating the above-stated disadvantages of the commercial glass and the modified glass.

The glass of the present invention is characterized by consisting essentially of 2 to 8% by weight of FeO, 18 to 23% by weight of the sum of $Na_2O$ and $K_2O$, 11 to 15% by weight of BaO, 3 to 5% by weight of $Al_2O_3$ and 58 to 64% by weight of $SiO_2$ and having a thermal expansion coefficient of $110 \times 10^{-7}$ to $130 \times 10^{-7}/°$ C. within the temperature range 0°–300° C. Although it is known that the FeO contained in glass absorbs infra-red rays, it was not previously known that the FeO in alkali glass having a large alkali component is effective in preventing its devitrification.

FIG. 2 shows the proportion of the components in the glass of the present invention. That is, the glass of the present invention has the composition included in the shaded area of FIG. 2.

In the composition for forming the glass of the present invention, if the content of FeO is smaller than 2% by weight, the resultant glass has an undesirably high devitrification tendency and if the content of FeO is greater than 8%, particularly greater than 10% by weight, it becomes difficult to glass-form the composition.

The glass of the present invention has a thermal expansion coefficient ranging from $110 \times 10^{-7}$ to $130 \times 10^{-7}/°$ C., within the temperature range 0°–300° C. in accordance with ASTM standard method designated C337–57 adopted 1957, a very low devitrification tendency and a sufficient infrared ray absorption property.

The following examples are cited to illustrate the practice of the present invention and are not intended to limit the scope of the present invention.

EXAMPLE 1

A preferred glass of the present invention was produced by components in the following range of percentages.

| Component: | Weight percent |
|---|---|
| $SiO_2$ | 63.3 |
| $Al_2O_3$ | 5.0 |
| $K_2O$ | 7.7 |
| $Na_2O$ | 11.0 |
| BaO | 11.0 |
| FeO | 2.0 |

The glass had a thermal expansion coefficient of $111 \times 10^{-7}/°$ C. and a sufficient infrared ray absorption characteristic and therefore, good workability.

The glass was formed into a tube and the resultant glass tube was used for producing a remanent reed switch device.

A DC voltage of 100 volts was impressed between the terminal of the reed switch for 500 hours at a temperature of 80° C. at a relative humidity of 90%.

Even after completion of this test the glass tube was not devitrified and had a resistivity of $12^{12}$ ohms which is the same as the initial resistivity of the glass tube and had no gas leakage.

A comparison glass 1 consisting of the components in the amount as detailed below was provided.

| Component: | Weight percent |
|---|---|
| $SiO_2$ | 62.2 |
| $Al_2O_3$ | 3.0 |
| $K_2O$ | 7.5 |
| $Na_2O$ | 13.0 |
| BaO | 13.3 |

A Comparison glass tube 1 made from the above-mentioned comparison glass was used for the production of a remanent reed switch device in the same procedure as that of the present example, and the resultant switch device was tested under the same conditions as those of the present example.

After about 100 hours, under the above test the comparison glass tube remarkably devitrified and leaked, and after 500 hours the initial resistivity of $10^{12}$ ohm of Comparison glass decreased to $10^{10}$ ohm.

EXAMPLE 2

The same procedure as that of Example 1 was repeated using a glass tube consisting of the components in the percentages as detailed below.

| Component: | Weight percent |
|---|---|
| $SiO_2$ | 59.2 |
| $Al_2O_3$ | 3.0 |
| $K_2O$ | 7.5 |
| $Na_2O$ | 13.0 |
| BaO | 13.3 |
| FeO | 4.0 |

The glass had a thermal expansion coefficient of $119 \times 10^{-7}/°$ C., a transition point of 510° C. and a transformation point of 450° C.

The sealing tube made of this glass had a sufficient infrared ray absorption property and showed no devitrification or gas leakage even after applying the above-mentioned testing conditions to the switch device sealed by the glass tube for 500 hours.

The resistivity of the glass tube remained at a value of $10^{12}$ ohm throughout the testing period.

The infrared ray absorption property of the glass is shown in FIG. 3. As FIG. 3 clearly shows, the glass tube of the present invention having a thickness of 1.4 mm. has an excellent absorption for the infrared rays. For comparison, the infrared ray absorptions of Comparison glass tube 1 as stated in Example 1 and Comparison glass tube 2 which is made of conventional glass for sealing tubes consisting of 67.82% of $SiO_2$, 2.96% of $Al_2O_3$, 14.51% of $K_2O$, 3.83% of $Na_2O$, 6.39% of $B_2O_3$ and 3.73% of FeO, were measured and the results are shown in FIG. 3. Referring to FIG. 3, Comparison glass tube 1 had a very poor absorption for infrared rays, and Comparison glass tube 2 had a good absorption but a little lower than that of the glass tube of the present example.

From the above-stated comparison, it is obvious that the glass of the present invention has excellent infrared ray absorption, and thus a good workability when the glass is heated by an infrared ray heater.

EXAMPLE 3

The same procedure as that of Example 1 was repeated except that the sealing glass tube consisted of the components in the amounts as detailed below.

| Component: | Weight percent |
|---|---|
| $SiO_3$ | 58.7 |
| $Al_2O_3$ | 3.5 |
| $K_2O$ | 8.3 |
| $Na_2O$ | 13.0 |
| BaO | 11.5 |
| FeO | 5.0 |

The glass tube had a thermal expansion coefficient of $123 \times 10^{-7}/°C$. which is very suitable for the remanent reed switch device, substantially no devitrification tendency and no gas leakage and a high infrared ray absorption.

What we claim is:

1. A glass useful for forming a reed switch sealing tube consisting essentially of 58 to 64% by weight of $SiO_2$, 3 to 5% by weight of $Al_2O_3$, 11 to 15% by weight of BaO, 18 to 23% by weight of the sum of $K_2O$ and $Na_2O$ and 2 to 8% by weight of FeO and having a thermal expansion coefficient of $110 \times 10^{-7}$ to $130 \times 10^{-7}/°C$. within a temperature range of $0°-300°C$.

2. A glass according to claim 1 consisting essentially of components having the following percentages by weight:

| Component: | Weight percent |
|---|---|
| $SiO_2$ | 63.3 |
| $Al_2O_3$ | 5.0 |
| $K_2O$ | 7.7 |
| $Na_2O$ | 11.0 |
| BaO | 11.0 |
| FeO | 2.0 |

3. A glass according to claim 1 consisting essentially of components having the following percentages by weight:

| Component: | Weight percent |
|---|---|
| $SiO_2$ | 59.2 |
| $Al_2O_3$ | 3.0 |
| $K_2O$ | 7.5 |
| $Na_2O$ | 13.0 |
| BaO | 13.3 |
| FeO | 4.0 |

4. A glass according to claim 1 consisting essentially of components having the following percentages by weight:

| Component: | Weight percent |
|---|---|
| $SiO_2$ | 58.7 |
| $Al_2O_3$ | 3.5 |
| $K_2O$ | 8.3 |
| $Na_2O$ | 13.0 |
| BaO | 11.5 |
| FeO | 5.0 |

References Cited

UNITED STATES PATENTS 3,698,921   10/1972   LaGrouw et al. _____ 106—52

OTHER REFERENCES

Volf, M. B.: Technical Glasses, London (1961), pp. 383–4.

HELEN M. McCARTHY, Primary Examiner

U.S. Cl. X.R.

313—221